United States Patent [19]

Ruzicka et al.

[11] 4,176,978
[45] Dec. 4, 1979

[54] PENCIL SHEATH AND COMPOSITION THEREFOR

[76] Inventors: Jan Ruźicka, No. 630 Marxova; Jindrich Lorenz, No. 678 Sidliste, both of Kralupy n/Vlt.; Vladimir Marek, No. 3 Komenskeho; Miroslav Tusl, No. 10 Komenskeho, both of Ceske Budejovice, all of Czechoslovakia

[21] Appl. No.: 2,104

[22] Filed: Jan. 9, 1979

Related U.S. Application Data

[63] Continuation-in-part of Ser. No. 871,947, Jan. 24, 1978, abandoned.

[30] Foreign Application Priority Data

Jan. 26, 1977 [CS] Czechoslovakia ................. 51588/77

[51] Int. Cl.² .............................................. C08J 9/06
[52] U.S. Cl. ......................................... 401/96; 260/42; 260/18; 521/139; 521/140; 521/910
[58] Field of Search ........... 521/139; 260/889, 897 A, 260/897 B, 897 C, 876 R; 401/96

[56] References Cited

U.S. PATENT DOCUMENTS 4,063,828  12/1977  Mukai et al. .................... 260/2.5 HB Primary Examiner—Morton Foelak

[57] ABSTRACT

There is disclosed a pencil sheath and composition therefor, the pencil having a core of graphite and the like. The sheath composition is composed substantially of plastics, fillers and two kinds of foaming agents with different decomposition temperatures. The pencil sheath has good cutting or sharpening properties, increased bending strength, and good adhesion to the graphite pencil core.

4 Claims, No Drawings

PENCIL SHEATH AND COMPOSITION THEREFOR

This application is a continuation-in-part of application Ser. No. 871,947, filed Jan. 24, 1978, now abandoned.

BACKGROUND OF THE INVENTION

The invention relates to a pencil sheath, and to a composition therefor adapted particularly for sheaths for cores of graphite and similar rods for the manufacture of pencils.

It is known that in addition to pencils manufactured by the classical method with wooden sheaths, pencils with sheaths made of different compositions of plastic materials are used. Such plastic sheaths incorporate foaming agents in order to improve their cutting properties. A drawback of pencils manufactured with already known sheath compositions is their relatively low bending strength and frequently a not quite uniform structure of extruded pencils.

Another drawback of previous actually used compositions is also a not always suitable combination of the requirement for good cutting properties when sharpening pencils with an extruded profile and with sufficient bending strength, and furthermore the not always perfect adhesion of the sheath with graphite, together with the possibility of their quick and cheap manufacture.

An increase of bending strength has been obtained in prior pencils by the addition of suitable fillers, as for instance sawdust, cut glass fibers, and the like, and in addition in the course of manufacture of the required profile by the connection of a number of strands and the like. However, the results have not been always satisfactory.

SUMMARY OF THE INVENTION

It is an object of this invention to eliminate or at least to substantially reduce the above drawbacks, and to provide a composition for the above purpose which is easy to cut when sharpening the pencil, has a good bending strength, and permits changes in the appearance of the pencil sheath by coloring or surface treatment.

The composition according to this invention comprises 100 parts by weight of polyvinyl aromatic plastic, 1 to 9.5 parts by weight of polyethylene, 1 to 30 parts by weight of polypropylene, polyvinylchloride, polyvinylacetate or their combinations, 1 to 20 parts by weight of talc, 5 to 50 parts by weight of glass fibers, 0.3 to 2.0 parts by weight of a foaming agent with a decomposition temperature between 170° and 240° C., and 0.3 to 2.0 parts by weight of a foaming agent with a decomposition temperature between 100° and 160° C. This composition can contain instead of said 0.3 to 2.0 parts of a foaming agent with a decomposition temperature between 100° and 160° C. up to 20 parts by weight of a foamable plastic. The above mentioned foaming agents with decomposition temperatures from 100° to 160° C. also can be added as an ingredient of foamable polystyrene, foamable polyaromatic copolymer, foamable polyvinylchloride or foamable polyethylene having compositions disclosed below.

The composition according to this invention is extruded in an extruder provided with an extruding crosshead, into which plastic graphite is simultaneously continuously fed to form a core, or is extruded by another diposed upstream of the first-mentioned extruder. The extruded hexagonal profile, for example, is calibrated or sized in a calibration device and immediately thereafter is cut to the required length of a classical pencil. The proper surface of thus manufactured pencils can be adjusted by application of some varnish, or when using triple extruding heads by the application of a thin decorative coating of solid plastic material.

An advantage of the composition according to this invention is that the creation of a microporous structure takes place within two subsequent stages by two-stage foaming. The two-stage foaming is the result of two foaming agents with different points of decomposition. The structure of the extruded profiles can be adjusted by application of an extruding machine or of an extruder screw of special design.

Different antistatic agents for reducing the electric charge of pencils can be furthermore advantageously added into the composition; this is particularly required when using electric pencil sharpeners.

It is furthermore suitable to color the composition used to the shade of incense or cedar wood by using the required admixtures and pigments.

For the polyvinyl aromatic plastic there can advantageously be used acrylonitrile-butadiene-styrene plastics and other polystyrene plastics, such as, for instance, standard and tough polystyrenes, styrene-acrylonitrile plastics, and the like. If different plastics are used, it is necessary suitably to adjust the dosing of other components of the composition.

To improve the cutting property of extruded pencil profiles there can be used high pressure and low pressure polyethylene, polypropylene, polyvinylchloride, polyvinylacetate or suitably prepared mixtures of these plastics.

In order to increase the bending strength, a corresponding amount of talc is advantageously used; this simultaneously improves the structure of the foamed profile.

The main component added for improvement of the bending strength are cut glass fibers prepared with a suitable type of aminosilane. Glass fibers of the length of 2 to 12 mm. should be used.

As a foaming agent with decomposition temperature from 100° to 160° C. azo-bis-isobutylnitrile can be used, and as a foaming agent with decomposition temperature from 170° to 240° C. azodicarbonamide can be used.

The foamable polystyrene, foamable aromatic copolymer, foamable polyvinylchloride or foamable polyethylene incorporating a foaming agent as above set forth with a decomposition temperature from 100° to 160° C. may be added in an amount up to 20 parts by weight, preferably 1-20 parts by weight, of the pencil sheathing composition. The above-enumerated foamable plastic materials have such compositions that the preferred 1-20 parts by weight, of the foamable plastic material contains 0.3 to 2 parts by weight of the foaming agent.

The composition according to this invention is suitable particularly for sheaths of graphite rods for the manufacture of pencils both of hexagonal and circular cross section, and can also be used for manufacture of pastel crayons. Pencils with sheats of compositions according to this invention are characterized by good cutting properties for sharpening, good bending strength, and in the case of a suitable surface treatment by varnishes or by coextrusion of a thin decorative plastic coating, also with good surface appearance.

The manufacture of pencils from the described composition presents advantages over classical manufacturing methods since no waste occurs, the manufacturing process is simple, the costs for the required manufacturing apparatus and the required space are lower, and the manufacturing environment is greatly improved. The introduction of the composition according to this invention results in substantial savings of wood, which is more and more difficult to obtain. Equally, the savings in attendants' time for the operation of the necessary apparatus are appreciable.

Example 1

A composition was prepared of 100 parts by weight of acrylonitrile-butadiene-styrene plastic of common production (FORSAN 752, also designated as ABS), 5 parts by weight of polyethylene (BRALEN 03.23), 40 parts by weight of cut glass fibers 6 mm. long, dressed with aminosilane and 5 parts by weight of talc. This composition was extruded with the addition of color admixtures and pigments required for coloring the composition to the shade of incense wood. The extruded composition was thereafter granulated.

To 100 parts by weight of thus obtained granulate after the addition of 0.3 parts by weight of medicinal oil, 5 parts by weight of talc, 5 parts by weight of foamable polystyrene and 0.5 parts of azodicarbonamide, the mixture was treated in a slow moving mixer.

The obtained composition was extruded on an extruder through a cross-extruding head, into which continuously classical graphites were dosed, or plastic graphite was extruded and was coated by the composition in a manner similar to the coating or sheathing of cables. The extruded profile was thereafter calibrated or sized and cut to lengths required of pencils.

The thus manufactured pencil profile had cutting properties at the minimum comparable with classical pencils and a modulus of elasticity in bending of 38,000 kp/cm$^2$.

The following table summarizes Examples 2 to 8, inclusive, or compositions according to this invention and their evaluation. The cutting properties of all of Examples 1 to 8, inclusive, were comparable at the minimum with cutting properties of pencils manufactured by the classical method with sheaths of cedar or incense wood.

TABLE

| Examples 2 to 8, inclusive, and their evaluation | | | | | | | |
|---|---|---|---|---|---|---|---|
| Composition No. | 2 | 3 | 4 | 5 | 6 | 7 | 8 |
| | parts by weight | | | | | | |
| KRASTEN 127 /polystyrene/ | 100 | — | — | — | 100 | — | — |
| KRASTEN 472 /polystyrene/ | — | — | 100 | — | — | 100 | — |
| styrene-acronitrile | — | — | — | 100 | — | — | 100 |
| FORSAN 752 /ABS/ | — | 100 | — | — | — | — | — |
| BRALEN 03.23 /polyethylene/ | 9.5 | 5 | — | 9.5 | 5 | — | — |
| MOSTEN 52517 /polypropylene/ | — | 5 | 10 | — | — | — | — |
| polyvinylacetate | — | — | — | — | 5 | — | 10 |
| PVC | — | — | — | — | — | 10 | — |
| cut glass fibers | 30 | 40 | 30 | 30 | 20 | 35 | 30 |
| talc | 5 | 10 | 10 | 5 | 5 | 10 | 5 |
| foamable polystyrene | 5 | — | 10 | — | — | — | — |
| foamable polyethylene | — | — | — | — | — | 10 | 10 |
| azo-bis-isobutyronitrile | — | 0.5 | — | 0.5 | 0.5 | — | — |
| azodicarbonamide | 0.5 | 0.5 | 0.5 | 0.5 | 0.5 | 0.5 | 0.5 |

TABLE-continued

| Examples 2 to 8, inclusive, and their evaluation | | | | | | | |
|---|---|---|---|---|---|---|---|
| Composition No. | 2 | 3 | 4 | 5 | 6 | 7 | 8 |
| | parts by weight | | | | | | |
| medicinal oil | 0.2 | 0.2 | 0.2 | 0.2 | 0.2 | 0.2 | 0.2 |
| modulus of elasticity in bending × 10$^3$ | 35 | 37 | 36 | 38 | 40 | 39 | 37 |

Example 9

In Example 9 a comparison is made with a thermoplastic pencil manufactured in Japan.

The composition of the sheath of the Japanese pencil consisted of: 100 parts of standard polystyrene (Styron 666), 53 parts of cut glass fibers, 25 parts of high pressure polystyrene, 0.8 parts of polyethyleneglycole, 0.35 parts of talc, 0.5 parts of azodicarbonamide, all parts by weight. The composition had been extruded on an extruder with an extrusion cross-head with simultaneous coating of the extruded graphite.

The Japanese pencils made of this composition had a modulus of elasticity in bending of 30,000 kp/cm$^2$, which is substantially lower than the modulus of elasticity of any of the pencils of Examples 1 to 8, inclusive.

Although the invention is illustrated and described with reference to a plurality of preferred embodiments thereof, it is to be expressly understood that it is in no way limited to the disclosure of such a plurality of preferred embodiments, but is capable of numerous modifications within the scope of the appended claims.

What is claimed is:

1. A composition, particularly adapted for sheaths of graphite and similar rods in the manufacture of pencils, comprising in combination:

100 parts of polyvinylaromatic plastic,
1 to 9.5 parts of polyethylene,
a component selected from group A consisting of the following compounds:

| | |
|---|---|
| A | 1 to 30 parts of polypropylene, 1 to 30 parts of polyvinylchloride, 1 to 30 parts of polyvinylacetate, |

1 to 30 parts of a combination of at least two of said compounds of group A,
1 to 20 parts of talc,
5 to 50 parts of glass fibers,
0.3 to 2.0 parts of a foaming agent with a decomposition temperature between 170° and 240° C., and
a component selected from group B consisting of the following compounds:

| | |
|---|---|
| B | 0.3 to 2.0 parts by weight of a foaming agent with a decomposition temperature between 100 and 160° C., 1 to 20 parts by weight of foamable polymer of anethylenic unsaturated monomer. | said 1 to 20 parts by weight of foamable polymer of an ethylenic unsaturated monomer containing from 0.3 to 2.0 parts by weight of a foaming agent with a decomposition temperature between 100° and 160° C.,
all parts being weight.

2. In a pencil having a marking core contained in a sheath, the improved sheath made of a composition comprising in combination:
100 parts of polyvinylaromatic plastic,
1 to 9.5 parts of polyethylene,
a component selected from group A consisting of the following compounds:

A {
  1 to 30 parts of polypropylene,
  1 to 30 parts of polyvinylchloride,
  1 to 30 parts of polyvinylacetate,
}

1 to 30 parts of a combination of at least two of said compounds of group A,
1 to 20 parts of talc,
5 to 50 parts of glass fibers,
0.3 to 2.0 parts of a foaming agent with a decomposition temperature between 170° and 240° C., and
a component selected from group B consisting of the following compounds:

B {
  0.3 to 2.0 parts of a foaming agent with a decomposition temperature between 100° and 160° C.,
  1 to 20 parts by weight of foamable polymer of anethylenic unsaturated monomer,
} said 1 to 20 parts by weight of foamable polymer of an ethylenic unsaturated monomer containing from 0.3 to 2.0 parts by weight of a foaming agent with a decomposition temperature between 100° and 160° C.,
all parts being by weight.

3. The pencil of claim 2, wherein the sheath was extruded.

4. The pencil of claim 2, wherein the sheath was extruded onto the core.

* * * * *